US009109077B2

(12) United States Patent
Mohmeyer et al.

(10) Patent No.: US 9,109,077 B2
(45) Date of Patent: Aug. 18, 2015

(54) FOAMED POLYURETHANES HAVING IMPROVED FLEXING ENDURANCE PROPERTIES

(75) Inventors: Nils Mohmeyer, Osnabrueck (DE); Daniel Freidank, Lemfoerde (DE); Sibylle Schoeps, Muenster (DE); Andreas Emge, Lemfoerde (DE); Achim Loeffler, Speyer (DE); Marco Ortalda, Turin (IT)

(73) Assignee: BASF SE, Ludwigshafen (DE)

( * ) Notice: Subject to any disclaimer, the term of this patent is extended or adjusted under 35 U.S.C. 154(b) by 41 days.

(21) Appl. No.: 12/741,618

(22) PCT Filed: Nov. 13, 2008

(86) PCT No.: PCT/EP2008/065467
§ 371 (c)(1),
(2), (4) Date: May 6, 2010

(87) PCT Pub. No.: WO2009/063004
PCT Pub. Date: May 22, 2009

(65) Prior Publication Data
US 2010/0227939 A1 Sep. 9, 2010

(30) Foreign Application Priority Data
Nov. 14, 2007 (EP) .................... 07120716

(51) Int. Cl.
*C08G 18/63* (2006.01)
*C08G 18/10* (2006.01)
*C08G 18/40* (2006.01)
*C08G 101/00* (2006.01)

(52) U.S. Cl.
CPC .............. *C08G 18/632* (2013.01); *C08G 18/10* (2013.01); *C08G 18/4072* (2013.01); *C08G 18/63* (2013.01); *C08G 2101/0008* (2013.01); *C08G 2101/0033* (2013.01); *C08G 2101/0066* (2013.01); *C08G 2101/0083* (2013.01); *C08G 2410/00* (2013.01)

(58) Field of Classification Search
CPC ................ C08G 18/63; C08G 18/632; C08G 2101/0033
USPC .......................... 521/170, 172, 174
See application file for complete search history.

(56) References Cited

U.S. PATENT DOCUMENTS

| 3,615,972 | A | | 10/1971 | Morehouse et al. | |
|---|---|---|---|---|---|
| 4,390,645 | A | | 6/1983 | Hoffman et al. | |
| 4,568,705 | A | | 2/1986 | Grace et al. | |
| 4,764,537 | A | | 8/1988 | Horn et al. | |
| 4,980,386 | A | * | 12/1990 | Tiao et al. | 521/108 |
| 4,997,857 | A | | 3/1991 | Timberlake et al. | |
| 5,236,961 | A | * | 8/1993 | Ho et al. | 521/51 |
| 5,334,620 | A | * | 8/1994 | Horn et al. | 521/51 |
| 5,358,984 | A | | 10/1994 | Hayes et al. | |
| 5,364,906 | A | | 11/1994 | Critchfield et al. | |
| 5,585,409 | A | * | 12/1996 | Volkert et al. | 521/51 |
| 5,700,847 | A | * | 12/1997 | Thompson | 521/159 |
| 5,830,944 | A | | 11/1998 | Meyer et al. | |
| 5,840,782 | A | * | 11/1998 | Limerkens et al. | 521/174 |
| 5,889,068 | A | * | 3/1999 | Madaj et al. | 521/137 |
| 5,900,087 | A | * | 5/1999 | Chakrabarti et al. | 156/82 |
| 5,990,232 | A | | 11/1999 | Shen et al. | |
| 6,013,731 | A | | 1/2000 | Holeschovsky et al. | |
| 6,034,148 | A | * | 3/2000 | Kelly et al. | 521/137 |
| 6,100,310 | A | * | 8/2000 | Ho | 521/159 |
| 6,136,879 | A | * | 10/2000 | Nishida et al. | 521/174 |
| 6,291,538 | B1 | * | 9/2001 | Okubo et al. | 521/128 |
| 6,329,441 | B1 | | 12/2001 | Okubo et al. | |
| 6,590,057 | B1 | * | 7/2003 | Brecht et al. | 528/52 |
| 7,456,229 | B2 | * | 11/2008 | Hager et al. | 521/170 |
| 2004/0082677 | A1 | | 4/2004 | Michels et al. | |
| 2004/0102538 | A1 | * | 5/2004 | Bruchmann et al. | 521/172 |
| 2004/0220290 | A1 | * | 11/2004 | Grimm et al. | 521/170 |
| 2007/0043133 | A1 | * | 2/2007 | Carvalho et al. | 521/172 |
| 2007/0179208 | A1 | | 8/2007 | Schuette et al. | |
| 2007/0254973 | A1 | * | 11/2007 | Emge et al. | 521/170 |

FOREIGN PATENT DOCUMENTS

| DE | 36 07 447 | 9/1987 |
|---|---|---|
| DE | 40 32 148 | 4/1992 |
| DE | 102 48 949 | 5/2004 |
| EP | 0 153 639 | 9/1985 |
| EP | 0 163 188 | 12/1985 |
| EP | 0 365 986 | 5/1990 |
| EP | 0 439 755 | 8/1991 |
| EP | 0 461 800 | 12/1991 |
| EP | 0 622 384 | 11/1994 |
| EP | 0 664 306 | 7/1995 |
| EP | 0 894 812 | 2/1999 |

(Continued)

*Primary Examiner* — Melissa Rioja
(74) *Attorney, Agent, or Firm* — Oblon, McClelland, Maier & Neustadt, L.L.P.

(57) ABSTRACT

The present invention relates to foamed polyurethane obtainable by mixing a) polyisocyanates, b) relatively high molecular weight compounds having groups reactive toward isocyanate groups, c) solid particles, d) blowing agents, e) if appropriate, chain extender, crosslinking agent or mixtures thereof, f) if appropriate, catalyst and g) if appropriate, other additives to give a reaction mixture and allowing the reaction mixture to react to completion, the propotion of chain extender being less than 6% by weight, based on the total weight of the components a) to f), the content of solid particles being greater than 15% by weight, based on the total weight of the components a) to f), and the average functionality of the relatively high molecular weight compounds having groups reactive toward isocyanate groups being less 2.5. The present invention furthermore relates to a molding comprising a foamed polyurethane according to the invention, a process for the preparation of the foamed polyurethane according to the invention and the use of a molding according to the invention as a shoe sole.

24 Claims, No Drawings

(56) References Cited

FOREIGN PATENT DOCUMENTS

| | | |
|---|---|---|
| EP | 1 042 384 | 10/2000 |
| EP | 1 736 489 | 12/2006 |
| WO | 99 05195 | 2/1999 |
| WO | 99 33893 | 7/1999 |
| WO | 00 59971 | 10/2000 |
| WO | 01 04178 | 1/2001 |
| WO | 2005 116101 | 12/2005 |

* cited by examiner

FOAMED POLYURETHANES HAVING IMPROVED FLEXING ENDURANCE PROPERTIES

The present invention relates to foamed polyurethane obtainable by mixing a) polyisocyanates, b) relatively high molecular weight compounds having groups reactive toward isocyanate groups, c) solid particles having an average diameter of from 0.01 to 50 µm, d) blowing agents, e) if appropriate, chain extender, crosslinking agent or mixtures thereof, f) if appropriate, catalyst and g) if appropriate, other additives to give a reaction mixture and allowing the reaction mixture to react to completion, the proportion of chain extender being less than 6% by weight, based on the total weight of the components a) to f), the content of solid particles being greater than 15% by weight, based on the total weight of the components a) to f), and the average functionality of the relatively high molecular weight compounds having groups reactive toward isocyanate groups being less than 2.5. The present invention furthermore relates to a molding comprising a foamed polyurethane according to the invention, a process for the preparation of the foamed polyurethane according to the invention and the use of a molding according to the invention as a shoe sole.

Other embodiments of the present invention are evident from the claims, the description and the examples. Of course, the abovementioned features of the subject according to the invention and those still to be explained below can be used not only in the combination stated in each case but also in other combinations without departing from the scope of the invention.

Owing to their broad property profile, polyurethanes are used nowadays in a multiplicity of applications. Polyurethanes can be used both in compact and in foamed form. In particular, microcellular elastomers and integral foams are in competition with rubber. Thus, EP 1042384 describes foamed polyurethanes having a density of from 150 to 500 g/l for shoe soles, which are obtained by reacting a polyol component comprising a polyetherpolyol having 2 or more hydroxyl groups, a polymer polyol comprising polymer particles, and chain extenders in the presence of blowing agent with polyisocyanates. The proportion of polymer particles is from 10 to 30% by weight, based on the total weight of the polyetherpolyol and of the polymer polyol. In the examples, mainly trifunctional polyols are used.

Compared with rubber, such polyurethanes have the advantage that the required mechanical properties, such as, for example, tensile strength or elongation at break, can be achieved at lower density than rubber and the time-consuming step of rubber vulcanization is dispensed with; on the other hand, rubber has the advantage of better nonslip properties, in particular better wet nonslip properties, better flexing endurance properties, in particular at low temperatures, and better haptic properties, i.e. the sensation on touching is more pleasant.

It was an object of the present invention to provide polyurethanes which have improved nonslip properties, in particular wet nonslip properties, better flexing endurance properties, even at low temperatures, and rubber-like haptic properties.

The object according to the invention was achieved by foamed polyurethane obtainable by mixing a) polyisocyanates, b) relatively high molecular weight compounds having groups reactive toward isocyanate groups, c) solid particles having an average particle diameter of from 0.01 to 50 µm, d) blowing agents, e) if appropriate, chain extender, crosslinking agent or mixtures thereof, f) if appropriate, catalyst and g) if appropriate, other additives to give a reaction mixture and allowing the reaction mixture to react to completion, the proportion of chain extender being less than 6% by weight, based on the total weight of the components a) to f), the content of solid particles being greater than 15% by weight, based on the total weight of the components a) to f), and the average functionality of the relatively high molecular weight compounds having groups reactive toward isocyanate groups being less than 2.5.

Foamed polyurethane is known and comprises foams according to DIN 7726 of all known polyisocyanate polyadducts and of polymer blends comprising at least 50% by weight of polyisocyanate polyadducts. The gross density of the foamed polyurethane is, according to DIN EN ISO 845, from 150 g/l to 1100 g/l, preferably from 200 to 1000 g/and particularly preferably from 500 to 950 g/l.

Preferably, the foamed polyurethane is used in the form of resilient foams and in particular of resilient polyurethane moldings having a compact surface and cellular core, so-called integral polyurethane foams. Integral polyurethane foams and their preparation have long been known and are described, for example, in Modern Shoemaking No. 61: Solings, November 2001, Stephen Abbott and Mike George, Satra Technology Centre 2001. Integral polyurethane foams are used in different areas. A typical use is that as a shoe sole, for example for walking shoes, sports shoes, sandals and boots, but also in the area of interior automotive trim, such as steering wheels, headrests, car door side parts, car instrument panels, car center consoles or gear shift knobs. Further possible applications are chair armrests or as motorcycle seats.

In the context of the present invention, integral polyurethane foams are understood as meaning polyurethane foams according to DIN 7726 having a cellular core and compact surface, the edge zone having a higher density than the core, owing to the shaping process. The total gross density averaged over the core and the edge zone is, according to DIN EN ISO 845, from 150 to 1100 g/l, preferably from 200 to 1000 g/l and in particular from 500 to 950 g/l.

Polyisocyanates (a) comprise the aliphatic, cycloaliphatic and aromatic di- or polyfunctional isocyanates known from the prior art (constituent a-1) and any desired mixtures thereof. Examples are diphenylmethane 4,4'-diisocyanate, diphenylmethane 2,4'-diisocyanate, the mixtures of monomeric diphenylmethane diisocyanates and homologs of diphenylmethane diisocyanate which have a larger number of nuclei (polymer MDI), tetramethylene diisocyanate, hexamethylene diisocyanate (HDI), isophorone diisocyanate (IPDI), tolylene 2,4- or 2,6-diisocyanate (TDI) or mixtures of said isocyanates.

4,4'-MDI is preferably used. The preferably used 4,4'-MDI may comprise from 0 to 20% by weight of 2,4' MDI and small amounts, up to about 10% by weight, of allophanate- or uretonimine-modified polyisocyanates. Small amounts of polyphenylenepolymethylene polyisocyanate (polymer MDI) may also be used. The total amount of these highly functional polyisocyanates should not exceed 5% by weight of the isocyanate used.

The polyisocyanate component (a) is preferably used in the form of polyisocyanate prepolymers. These polyisocyanate prepolymers are obtainable by reacting polyisocyanates (a-1) described above with polyols (a-2), for example at temperatures of from 30 to 100° C., preferably at about 80° C., to give the prepolymer. 4,4'-MDI together with uretonimine-modified MDI and commercially available polyols based on polyesters, for example starting from adipic acid, polyethers, for example starting from ethylene oxide and/or propylene oxide or polytetrahydrofuran (PTHF), or polycarbonatols, as described, for example, in European patent application EP 07101407.0, is preferably used for the preparation of the prepolymers according to the invention.

Polyols (a-2) are known to the person skilled in the art and are described, for example, in "Kunststoffhandbuch, volume 7, Polyurethane", Carl Hanser Verlag, 3rd edition 1993, chapter 3.1.

Ether-based prepolymers are preferably obtained by reacting polyisocyanates (a-1), particularly preferably 4,4'-MDI, with di- or trifunctional polyoxypropylenepolyols and/or polyoxypropylenepolyoxyethylenepolyols. Their preparation is mostly effected by the generally known base-catalyzed addition reaction of propylene oxide alone, as a mixture with ethylene oxide or blockwise with H-functional, in particular OH-functional, initiators. Initiators used are, for example, water, ethylene glycols or propylene glycols or glycerol or trimethylolpropane. Furthermore, multimetal cyanide compounds, so-called DMC catalysts, may also be used as catalysts. Furthermore, Lewis acids, such as boron trifluoride, may be used as catalysts. Polyethers as described below under b) are preferably used as component (a-2).

With the use of ethylene oxide/propylene oxide mixtures, the ethylene oxide is preferably used in an amount of 10-50% by weight, based on the total amount of alkylene oxide. The incorporation of the alkylene oxides can be effected here blockwise or as a random mixture. The incorporation of an ethylene oxide terminal block ("EO cap") in order to increase the content of more reactive terminal primary OH groups is particularly preferred. The number average molecular weight of the polyols (a-2) is preferably from 400 to 4500 g/mol.

If appropriate, customary chain extenders or crosslinking agents are added to said polyols in the preparation of the isocyanate prepolymers. Such substances are described below under e). Dipropylene glycol or tripropylene glycol is particularly preferably used as a chain extender or crosslinking agent.

Relatively high molecular weight compounds b) having groups reactive toward isocyanate groups have a molecular weight greater than 400 g/mol. The molecular weight is preferably greater than 550 g/mol and may be, for example, polyetherols, polyesterols or polycarbonatols, the average functionality of the relatively high molecular weight compounds having groups reactive toward isocyanate groups being less than 2.5.

Polyetherols are prepared by known processes, for example by anionic polymerization with alkali metal hydroxides or alkali metal alcoholates as catalysts and with addition of at least one initiator which comprises 2 or 3 bound hydrogen atoms reactive toward isocyanate groups per molecule, or by cationic polymerization with Lewis acids, such as antimony pentachloride or boron fluoride etherate, from one or more alkylene oxides having 2 to 4 carbon atoms in the alkylene radical. Suitable alkylene oxides are, for example, tetrahydrofuran, 1,3-propylene oxide, 1,2- or 2,3-butylene oxide and preferably ethylene oxide and 1,2-propylene oxide. Furthermore, multimetal cyanide compounds, so-called DMC catalysts, may also be used as catalysts. The alkylene oxides may be used individually, alternately in succession or as mixtures. Mixtures of 1,2-propylene oxide and ethylene oxide are preferred, the ethylene oxide being used in amounts of from 10 to 50% as a terminal ethylene oxide block ("EO cap") so that the resulting polyols have more than 70% of terminal primary OH groups.

Water or dihydric or trihydric alcohols, such as ethylene glycol, 1,2- and 1,3-propanediol, diethylene glycol, dipropylene glycol, 1,4-butanediol, glycerol or trimethylolpropane, preferably ethylene glycol, 1,2- and 1,3-propanediol, diethylene glycol, dipropylene glycol, tripropylene glycol and 1,4-butanediol, are suitable as the initiator molecule.

The polyetherpolyols, preferably polyoxypropylenepolyoxyethylenepolyols, have an average functionality of from 1.7 to 4, particularly preferably from 1.8 to 3 and in particular from 1.9 to 2.5, and molecular weights of from 1000 to 12 000, preferably from 1400 to 8000, g/mol and particularly preferably from 1700 to 6000 g/mol. In particular, polyetherpolyols used are those which were prepared by DMC catalysis, starting from a difunctional initiator.

Polytetrahydrofuran is likewise preferably used as polyetherpolyols. The functionality thereby is usually from 1.8 to 3, preferably from 1.9 to 2.5 and particularly preferably about 2, and the number average molecular weight is usually from 500 to 4000 g/mol, preferably from 750 to 3000 g/mol, particularly preferably from 800 to 2500 g/mol and in particular about 2000 g/mol.

Polyesterpolyols can be prepared, for example, from organic dicarboxylic acids having 2 to 12 carbon atoms, preferably aliphatic dicarboxylic acids having 4 to 6 carbon atoms, and polyhydric alcohols, preferably diols, having 2 to 12 carbon atoms, preferably 2 to 6 carbon atoms. Examples of suitable dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used both individually and as a mixture. Instead of the free dicarboxylic acids, it is also possible to use the corresponding dicarboxylic acid derivatives, such as, for example, dicarboxylic esters of alcohols having 1 to 4 carbon atoms or dicarboxylic anhydrides. Dicarboxylic acid mixtures comprising succinic, glutaric and adipic acid in ratios of, for example, 20 to 35:35 to 50:20 to 32 parts by weight, and in particular adipic acid, are preferably used. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Ethanediol, diethylene glycol, 1,4-butanediol, 1,5-pentanediol and 1,6-hexanediol are preferably used. Polyesterpolyols obtained from lactones, e.g. ε-caprolactone, or hydroxycarboxylic acids, e.g. ω-hydroxycaproic acid, can furthermore be used.

For the preparation of the polyesterpolyols, the organic, e.g. aromatic and preferably aliphatic, polycarboxylic acids and/or polycarboxylic acid derivates and polyhydric alcohols can be subjected to polycondensation in the absence of a catalyst or preferably in the presence of esterification catalysts, expediently in an atmosphere comprising inert gas, such as, for example, nitrogen, carbon monoxide, helium, argon, etc., in the melt at temperatures of from 150 to 250° C., preferably from 180 to 220° C., if appropriate under reduced pressure, to the desired acid number, which is preferably less than 10, particularly preferably less than 2. According to a preferred embodiment, the esterification mixture is subjected to polycondensation at the above-mentioned temperatures to an acid number from 80 to 30, preferably from 40 to 30, under atmospheric pressure and subsequently under a pressure of less than 500 mbar, preferably from 50 to 150 mbar. Suitable esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entraining agents, such as, for example, benzene, toluene, xylene or chlorobenzene, for distilling off the condensation water azeotropically. For the preparation of the polyesterpolyols, the organic polycarboxylic acids and/or polycarboxylic acid derivatives and polyhydric alcohols are advantageously subjected to polycondensation in the molar ratio of 1:1 to 1.8, preferably 1:1.05 to 1.2.

The polyesterpolyols obtained preferably have a functionality of from 1.8 to 4, particularly preferably from 1.9 to 3 and in particular from 2.0 to 2.5 and a molecular weight of from 480 to 5000, preferably from 1000 to 4500, g/mol and in particular from 1600 to 4500.

Mixtures comprising polyetherols and polyesterols are preferably used as relatively high molecular weight compound b).

It is essential to the invention that the averaged functionality of the relatively high molecular weight compounds having groups reactive toward isocyanate is less than 2.5. Preferably, the average functionality of the relatively high molecular weight compounds having groups reactive toward isocyanate is less than 2.2. The proportion of relatively high molecular weight compounds having exactly two groups reactive toward isocyanate groups, so-called diols, is greater than 50% by weight, particularly preferably greater than 80% by weight and in particular 100% by weight, based on the total weight of the relatively high molecular weight compounds having groups reactive toward isocyanate groups b).

Suitable solid particles c) are all solids having a reinforcing effect. These preferably comprise particles having an average particle diameter of from 0.01 to 50 µm, particularly preferably from 0.1 to 10 µm. The particle size distribution may be monomodal or bi- or multimodal. Solid particles c) comprise inorganic and organic solids. Inorganic solids which may be used are, for example, barium sulfate, calcium sulfate, calcium carbonate, silicates, such as fumed silica, or silylated silicates. Silylated silicates used are preferably alkylsilylated silicates, the alkyl group(s) preferably having 1 to 18 carbon atoms. Organic solids which may be used are, for example, polymer polyetherols, polyurea dispersions, epoxy dispersions and polyisocyanate polyadduct polyols. Such solids and the preparation thereof is described, for example, in "Mihail Ionescu, Chemistry and Technology of Polyols for Polyurethanes, Rapra Technology Ltd., 2005, ISBN: 185957-491-2).

Solid particles preferably have at least one group reactive toward isocyanate groups. Particularly preferably, the solid particles c) are present dispersed in at least one of the relatively high molecular weight compounds b). If the dispersion medium is polyetherol or polyesterol in which solid particles comprising polymers obtained by free radical polymerization are present as the dispersed phase, this dispersion is also referred to as polymer polyol.

In the invention, the use of polymer polyols is particularly preferred. The addition of further relatively high molecular weight compounds having groups reactive toward isocyanate b) in addition to the dispersion medium can also be dispensed with.

In general, polymer polyols are known and are commercially available. Polymer polyols are prepared by free radical polymerization of the monomers, preferably acrylonitrile, styrene and, if appropriate, further monomers, of a macromer and, if appropriate, of a moderator with the use of a free radical initiator, generally azo or peroxide compounds, in a polyetherol or polyesterol as the continuous phase. The polyetherol or the polyesterol which constitutes the continuous phase and hence the dispersion medium is frequently also referred to as carrier polyol. The U.S. Pat. No. 4,568,705, U.S. Pat. No. 5,830,944, EP 163188, EP 365986, EP 439755, EP 664306, EP 622384, EP 894812 and WO 00/59971 may be mentioned here by way of example for the preparation of polymer polyols.

This is usually an in situ polymerization of acrylonitrile, styrene or preferably mixtures of styrene and acrylonitrile, for example in a weight ratio of from 90:10 to 10:90, preferably from 70:30 to 30:70.

Suitable carrier polyols are all polyols described under b). Macromers, also referred to as stabilizers, are linear or branched polyetherols having molecular weights of ≥1000 g/mol, which comprise at least one terminal, reactive ethylenic unsaturated group. The ethylenically unsaturated group can be attached to an existing polyol by reaction with carboxylic acids, such as acrylic acid, carboxylic acid halides, such as acrylic acid chloride, carboxylic anhydrides, such as maleic anhydride, fumaric acid, acrylate and methacrylate derivatives, ethylenically unsaturated epoxides, such as 1-vinylcyclohexene-3,4-expoxide, 1-butadiene monoxide, vinyl glycidyl ether, glycidyl methacrylate and allyl glycidyl ether, and isocyanate derivatives, such as 3-isopropenyl-1,1-dimethylbenzyl isocyanate, or isocyanatoethyl methacrylate. A further method is the preparation of a polyol by alkoxydation of propylene oxide and ethylene oxide with use of initiator molecules which have hydroxyl groups and are ethylenically unsaturated. Examples of such macromers are described in the documents U.S. Pat. Nos. 4,390,645, 5,364,906, EP 0461800, U.S. Pat. Nos. 4,997,857, 5,358,984, 5,990,232, WO 01/04178 and U.S. Pat. No. 6,013,731.

During the free radical polymerization, the macromers are also incorporated into the polymer chain. This results in the formation of copolymers having polyether and a polyacrylonitrile-styrene blocks which act as a phase mediator in the interface of continuous phase and dispersed phase and suppress the agglomeration of the polymer polyol particles. The proportion of the macromers may be up to greater than 90% by weight and is usually from 1 to 60% by weight, preferably from 1 to 40% by weight and particularly preferably from 1 to 15% by weight, based in each case on the total weight of the monomers used for the preparation of the polymer polyol.

For the preparation of polymer polyols, moderators, also referred to as chain-transfer agents, are usually used. By chain transfer of the growing free radical, the moderators reduce the molecular weight of the copolymers forming, with the result that the crosslinking between the polymer molecules is reduced, which influences the viscosity and the dispersion stability and the filterability of the polymer polyols. The proportion of moderators is usually from 0.5 to 25% by weight, based on the total weight of the monomers used for the preparation of the polymer polyol. Moderators which are usually used for the preparation of polymer polyols are alcohols, such as 1-butanol, 2-butanol, isopropanol, ethanol or methanol, cyclohexane, toluenes, mercaptans, such as ethanethiol, 1-heptanethiol, 2-octanethiol, 1-dodecanethiol, thiophenol, 2-ethylhexyl thioglycolates, methyl thioglycolates or cyclohexyl mercaptan, and enol ether compounds, morpholines and α-(benzoyloxy)styrene. Alkyl mercaptan is preferably used.

For the initiation of the free radical polymerization, peroxide or azo compounds, such as dibenzoyl peroxide, lauroyl peroxide, tert-amyl peroxy-2-ethylhexanoate, di-tert-butyl peroxide, diisopropyl peroxide carbonate, tert-butyl peroxy-2-ethylhexanoate, tert-butyl perpivalate, tert-butyl perneodecanoate, tert-butyl perbenzoate, tert-butyl percrotonate, tert-butyl perisobutyrate, tert-butyl peroxy-1-methylpropanoate, tert-butyl peroxy-2-ethylpentanoate, tert-butyl peroxyoctanoate and di-tert-butyl perphthalate, 2,2'-azobis(2,4-dimethylvaleronitrile), 2,2'-azobisisobutyronitrile (AIBN), dimethyl 2,2'-azobisisobutyrate, 2,2'-azobis(2-methylbutyronitrile) (AMBN), 1,1'-azobis(1-cyclohexanecarbonitrile), are usually used. The proportion of the initiators is usually from 0.1 to 6% by weight, based on the total weight of the monomers used for the preparation of the polymer polyol.

Owing to the reaction rate of the monomers and the half-life of the initiators, the free radical polymerization for the preparation of polymer polyols is usually carried out at temperatures of from 70 to 150° C. and a pressure up to 20 bar. Preferred reaction conditions for the preparation of polymer polyols are temperatures of from 80 to 140° C. at a pressure from atmospheric pressure to 15 bar.

Polymer polyols are prepared in continuous processes with the use of stirred tanks with continuous feed and discharge, stirred tank cascades, tubular reactors and loop reactors with continuous feed and discharge, or in batchwise processes by means of a batch reactor or of a semibatch reactor.

The reaction for the preparation of the polymer polyols can also be carried out in the presence of an inert solvent. Examples of solvents which may be used are: benzene, toluene, xylene, acetonitrile, hexane, heptane, dioxane, ethyl acetate, N,N-dimethylformamide, N,N-dimethylacetamide, etc. Benzene, xylene and toluene are preferred.

A difunctional polyether polyol having predominantly primary OH groups and a number average molecular weight of from 1000 to 12000 g/mol, preferably from 1400 to 8000 g/mol, particularly preferably from 1700 to 6000 g/mol, is preferably used as the carrier polyol for the preparation of the polymer polyol.

In a particularly preferred embodiment, polytetrahydrofuran (PTHF), usually having a number average molecular weight of from 500 to 4000 g/mol, preferably from 750 to 3000 g/mol, preferably from 800 to 2500 g/mol, in particular about 2000 g/mol, is used as the carrier polyol for the preparation of the polymer polyol.

Suitable ethylenically unsaturated monomers for the preparation of the solid fraction of the polymer polyol are, for example, butadiene, isoprene, 1,4-pentadiene, 1,6-hexadiene, 1,7-octadiene, styrene, alpha-methylstyrene, 2-methylstyrene, 3-methylstyrene, 4-methylstyrene, 2,4-dimethylstyrene, ethylstyrene, isopropylstyrene, butylstyrene, phenylstyrene, cyclohexylstyrene, benzylstyrene and similar derivatives; substituted styrenes, such as cyanostyrene, nitrostyrene, N,N-dimethylaminostyrene, acetoxystyrene, methyl 4-vinylbenzoate, phenoxystyrene, p-vinylphenyl oxide and similar derivatives; acrylates and substituted acrylates, such as acrylonitrile, acrylic acid, methacrylic acid, methylacryl acrylate, 2-hydroxyethyl acrylate, methyl methacrylate, cyclohexyl methacrylate, benzyl methacrylate, isopropyl methacrylate, octyl methacrylate, methacrylonitrile, ethyl alpha-ethoxyacrylate, methyl alpha-acetaminoacrylates, butyl acrylate, 2-ethylhexyl acrylate, phenyl acrylate, phenyl methacrylate, acrylamide, N,N-dimethylacrylamide, N,N-dibenzylacrylamide, N-butylacrylamide, methacryloylformamide and similar derivatives; vinyl esters, vinyl ethers, vinyl ketones, etc., such as vinyl acetate, vinyl butyrate, isopropenyl acetate, vinyl formate, vinyl acrylate, vinyl methacrylate, vinyl methoxy acetate, vinyl benzoate, vinyltoluene, vinylnaphthalene, vinyl methyl ether, vinyl propyl ether, vinyl butyl ether, vinyl 2-ethylhexyl ether, vinyl phenyl ether, vinyl 2-methoxyethyl ether, methoxybutadiene, vinyl 2-butoxyethyl ether, 2,4-dihydro-1,2-pyran, 2-butoxy-2'-vinyloxydiethyl ether, vinyl methyl ketone, vinyl ethyl ketone, vinyl phenyl ketone, vinyl ethyl sulfone, N-methyl-N-vinylacetamide, N-vinylpyrrolidone, vinylimidazole, divinyl sulfoxide, divinyl sulfone, sodium vinylsulfonate, methyl vinylsulfonate, N-vinylpyrrole, vinyl phosphonate and similar derivatives; dimethyl fumarate, dimethyl maleate, maleic acid, crotonic acid, fumaric acid, itaconic acid, monomethyl itaconate, tert-butylaminoethyl methacrylate, dimethylaminoethyl methacrylate, glycidyl acrylate, allyl alcohol, glycol monoesters of itaconic acid, vinylpyridine and similar derivatives.

Preferred ethylenically unsaturated monomers are styrene, acrylonitrile, acrylates and acrylamides.

In a preferred embodiment, acrylonitrile, styrene, in particular styrene and acrylonitrile in a ratio of from 1:3 to 3:1, are used as ethylenically unsaturated monomers. A macromer is furthermore preferably added to the polymerization. If appropriate, the polymerization is furthermore carried out with the use of a moderator and with the use of a free radical initiator.

In a preferred embodiment, the solid fraction comprises acrylonitrile, styrene and macromer, the proportion of acrylonitrile being from 10 to 75% by weight and preferably from 25 to 35% by weight, the proportion of styrene being from 30 to 90% by weight, preferably from 55 to 70% by weight, and the proportion of macromer being from 1 to 10% by weight, preferably from 3 to 6% by weight, based on the total weight of the solid fraction of the polymer polyol.

In a preferred embodiment, the polymer polyol has a solid fraction of from 25 to 90% by weight, particularly preferably from 30 to 60 and in particular from 35 to 55% by weight, based on the total weight of the polymer polyol.

The solids content of polymer polyols is calculated from the percentage ratio of the monomers used and of the macromer to the carrier polyols used and is determined on the prepared polymer polyol usually gravimetrically from the percentage ratio of the solid mass to the total mass of the polymer polyol.

The solids content, based on the total weight of the components a) to f), is at least 15% by weight. The solids content is preferably from 20 to 80, particularly preferably from 25 to 60, % by weight, based in each case on the total weight of the components a) to f). Mixtures of different solid particles c) may also be used.

Blowing agents d) are furthermore present in the preparation of polyurethane foams. These blowing agents comprise, if appropriate, water. Apart from water, generally known compounds having chemical and/or physical effect can additionally be used as blowing agents d). Chemical blowing agents are understood as meaning compounds which form gaseous products by reaction with isocyanate, such as, for example, water or formic acid. Physical blowing agents are understood as meaning compounds which are dissolved or emulsified in the starting materials of the polyurethane preparation and vaporize under the conditions of the polyurethane formation. These are, for example, hydrocarbons, halogenated hydrocarbons and other compounds, such as, for example, perfluorinated alkanes, such as perfluorohexane, chlorofluoro hydrocarbons and ethers, esters, ketones and/or acetals, for example (cyclo)aliphatic hydrocarbons having 4 to 8 carbon atoms, or fluoro hydrocarbons, such as Solkane® 365 mfc from Solvay Fluorides LLC. In a preferred embodiment, a mixture comprising at least one of these blowing agents and water is used as the blowing agent, in particular water as the sole blowing agent. If water is not used as a blowing agent, preferably exclusively physical blowing agents are used.

In a preferred embodiment, the content of water is from 0.025 to 3% by weight, preferably from 0.05 to 2% by weight, particularly preferably from 0.1 to 1.5% by weight, in particular from 0.15 to 1% by weight, based on the total weight of the components a) to g).

In a further preferred embodiment, hollow microspheres which comprise physical blowing agent are added as an additional blowing agent to the reaction mixture. The hollow microspheres can also be used as a mixture with the abovementioned additional chemical blowing agents and/or physical blowing agents.

The hollow microspheres usually consist of a shell of thermoplastic polymer and are filled in the core with a liquid, low-boiling substance based on alkanes. The preparation of such hollow microspheres is described, for example, in U.S. Pat. No. 3,615,972. The hollow microspheres generally have a diameter of from 5 to 50 μm. Examples of suitable hollow microspheres are obtainable under the trade name Expancell® from Akzo Nobel.

The hollow microspheres are generally added in an amount of from 0.5 to 5% by weight, based on the total weight of the components b), c) and d).

Substances having a molecular weight of less than 400 g/mol, particularly preferably of from 60 to 350 g/mol, are used as chain extenders and/or crosslinking agents e), chain extenders having 2 groups reactive toward isocyanates and crosslinking agents 3 groups reactive toward isocyanate. These may be used individually or, preferably, in the form of mixtures. Diols and/or triols having molecular weights of less than 400, particularly preferably of from 60 to 300 and in particular from 60 to 150, are preferably used. For example, aliphatic, cycloaliphatic and/or aromatic diols having 2 to 14, preferably 2 to 10, carbon atoms, such as ethylene glycol, 1,3-propanediol, 1,10-decanediol, 1,2-, 1,3- and 1,4-dihydroxycyclohexane, diethylene glycol, dipropylene glycol and preferably 1,4-butanediol, 1,6-hexanediol and bis(2-hydroxyethyl)hydroquinone, triols, such as 1,2,4- and 1,3,5-trihydroxycyclohexane, glycerol and trimethylolpropane, and low molecular weight polyalkylene oxides containing hydroxyl groups and based on ethylene oxide and/or 1,2-propylene oxide and the abovementioned diols and/or triols are suitable as initiator molecules. Monoethylene glycol, 1,4-butanediol and/or glycerol and ethoxylated derivatives thereof are particularly preferably used as chain extenders and/or crosslinking agents (e).

If chain extenders are used, it is essential for the invention that they are used in amounts of not more than 6% by weight, preferably not more than 5% by weight, particularly preferably not more than 4.5% by weight, more preferably not more than 4 and in particular not more than 3% by weight, based on the total weight of the components a) to f). Preferably, less than 8% by weight, particularly preferably less than 6% by weight, more preferably less than 5% by weight and in particular less than 4% by weight of chain extenders and crosslinking agents e), based on the total weight of the components a) to f), are used.

Compounds which greatly accelerate the reaction of the hydroxyl group-comprising compounds of component b) and, if appropriate, d) with the polyisocyanates a) are preferably used as catalysts f) for the preparation of the polyurethane foams. For example, amidines, such as 2,3-dimethyl-3,4,5,6-tetrahydropyrimidine, tertiary amines, such as triethylamine, tributylamine, dimethylbenzylamine, N-methyl-, N-ethyl- and N-cyclohexylmorpholine, N,N,N',N'-tetramethylethylenediamine, N,N,N',N'-tetramethyl-butanediamine, N,N,N',N'-tetramethylhexanediamine, pentamethyldiethylenetriamine, tetramethyl diaminoethyl ether, bis(dimethylaminopropyl)urea, dimethylpiperazine, 1,2-dimethylimidazole, 1-azabicyclo[3.3.0]octane and preferably 1,4-diazabicyclo[2.2.2]octane, and alkanolamine compounds, such as triethanolamine, triisopropanolamine, N-methyl- and N-ethyldiethanolamine and dimethylethanolamine, may be mentioned. Organic metal compounds, preferably organic tin compounds, such as tin(II) salts of organic carboxylic acids, e.g. tin(II) acetate, tin(II) octoate, tin(II) ethylhexoate and tin(II) laurate, and the dialkyltin(IV) salts of organic carboxylic acids, e.g. dibutyltin diacetate, dibutyltin dilaurate, dibutyltin maleate and dioctyltin diacetate, and bismuth carboxylates, such as bismuth(III) neodecanoate, bismuth 2-ethylhexanoate and bismuth octanoate, or mixtures thereof are also suitable. Furthermore, titanium- and zinc-based catalysts, such as titanium(IV) bis(ethylacetoacetato) diisopropoxide, titanium(IV) diisopropoxide bis(2,4-pentanedionate), titanium(IV) triisopropoxide 2,4-pentanedionate, ethoxybis(pentane-2,4-dionato-0,0') (propan-2-olato)titanium, titanium(IV) oxide acetylacetonate, bis(diacetylacetonato)titanium(IV) butoxide isopropoxide, bis(diacetylacetonato)titanium(IV) ethoxide isopropoxide, and saturated or unsaturated, aliphatic or alicyclic and aromatic carboxylates of zinc, such as zinc(II) naphthenate, zinc(II) decanoate, zinc(II) butyrate, such as zinc(II) 4-cyclohexylbutyrate, zinc(II) neodecanoate, zinc(II) isobutyrate, zinc(II) benzoate, and zinc(II) bis-2,2,6,6-tetramethyl-3,5-heptanedionoate and zinc(II) p-toluenesulfonate may also be used. Zinc(II) octoate and zinc(II) 2-ethylhexanoate are particularly preferably used. Titanium- and zinc-based catalysts are preferably used in combination with one another. Such combinations are described, for example, in EP 1736489. The organic metal compounds can be used alone or preferably in a combination with strongly basic amines. If the component b) is an ester, preferably exclusively amine catalysts are used.

Preferably from 0.001 to 5% by weight, in particular from 0.05 to 2% by weight, of catalyst or catalyst combination, based on the weight of the component b), is used.

If appropriate, assistants and/or additives (g) may also be added to the reaction mixture for the preparation of the polyurethane foams. Surface-active substances, foam stabilizers, cell regulators, release agents, fillers, dyes, pigments, hydrolysis stabilizers, odor-absorbing substances, fragrances and fungistatic and/or bacteriostatic substances may be mentioned by way of example.

Suitable surface-active substances are, for example, compounds which serve for promoting the homogenization of the starting materials and, if appropriate, are also suitable for regulating the cell structure. Emulsifiers, such as the sodium salts of castor oil sulfates or of fatty acids, and salts of fatty acids with amines, for example of oleic acid with diethylamine, of stearic acid with diethanolamine, and of ricinoleic acid with diethanolamine, salts of sulfonic acids, e.g. alkali metal or ammonium salts of dodecylbenzenesulfonic acid or dinaphthylmethanedisulfonic acid, and ricinoleic acid; foam stabilizers, such as siloxane-oxalkylene copolymers and other organopolysiloxanes, oxethylated alkylphenols, oxethylated fatty alcohols, liquid paraffins, castor oil esters or ricinoleic esters, Turkey red oil and peanut oil, and cell regulators, such as paraffins, fatty alcohols and dimethylpolysiloxanes, may be mentioned by way of example. For improving the emulsifying effect of the cell structure and/or stabilizing the foam, oligomeric acrylates having polyoxyalkylene and fluoroalkane radicals as side groups are also suitable. The surface-active substances are usually used in amounts of from 0.01 to 5 parts by weight, based on 100 parts by weight of the component (b).

The following may be mentioned by way of example as suitable release agents: reaction products of fatty acid esters with polyisocyanates, salts of polysiloxanes comprising amino groups and fatty acids, salts of saturated or unsaturated (cyclo)aliphatic carboxylic acids having at least 8 carbon atoms and tertiary amines, and in particular internal release agents, such as carboxylic esters and/or carboxamides, prepared by esterification or amidation of a mixture of montanic acid and at least one aliphatic carboxylic acid having at least 10 carbon atoms with at least difunctional alkanolamines, polyols and/or polyamines having molecular weights of from 60 to 400 g/mol, as disclosed, for example, in EP 153 639, mixtures of organic amines, metal salts of stearic acid and organic mono- and/or dicarboxylic acids or anhydrides thereof, as disclosed, for example, in DE-A-3 607 447, or mixtures of an imino compound, the metal salt of a carboxylic acid and, if appropriate, of a carboxylic acid, as disclosed, for example, in U.S. Pat. No. 4,764,537.

In addition to the solid particles described under c), in particular fillers having a reinforcing effect and a particle size greater than 50 μm may be added as fillers. These are the customary organic and inorganic fillers, reinforcing materials, weighting materials, coating materials, etc. known per se. The following may be mentioned specifically by way of example: inorganic fillers, such as silicate minerals, for example phyllosilicates, such as antigorite, bentonite, serpentin, homblendes, amphiboles, chrysotile, calcium carbonates and talc, metal oxides, such as kaolin, aluminas, titanium oxides, zinc oxide and iron oxides, metal salts such as chalk and barite, and inorganic pigments, such as cadmium sulfide, zinc sulfide, and glass, etc. Kaolin (China Clay), aluminum silicate and coprecipitates of barium sulfate and aluminum silicate, and natural and synthetic fibrous minerals, such as wollastonite, metal fibers and in particular glass fibers of various lengths, which, if appropriate, may be sized, are preferably used. Examples of suitable organic fillers are: carbon black, melamine, rosin, cyclopentadienyl resins and graft polymers and cellulose fibers, polyamide, polyacrylonitrile, polyurethane and polyester fibers based on aromatic and/or aliphatic dicarboxylic esters and in particular carbon fibers.

The inorganic and organic fillers can be used individually or as mixtures and are added to the reaction mixture advantageously in amounts of from 0.5 to 50% by weight, preferably from 1 to 40% by weight, based on the weight of the components (a) to (c), but the content of mats, nonwovens and woven fabrics comprising natural and synthetic fibers may reach values of up to 80% by weight.

The preparation of the polyurethane according to the invention is effected by mixing a) polyisocyanates, b) relatively high molecular weight compounds having groups reactive toward isocyanate groups, c) solid particles, d) if appropriate, chain extender and/or crosslinking agent, e) if appropriate, blowing agents, f) if appropriate, catalyst and g) if appropriate, other additives to give a reaction mixture and allowing the reaction mixture to react to completion, the proportion of chain extender being less than 6% by weight, based on the total weight of the components a) to f), the content of solid particles being greater than 15% by weight, based on the total weight of the components a) to f), and the average functionality of the relatively high molecular weight compounds having groups reactive toward isocyanate groups being less than 2.5. The components a) to f) described above are preferably used as components a) to f). For the preparation of the foamed polyurethane according to the invention, these are mixed with one another in amounts such that the ratio of the number of equivalents of NCO groups of the polyisocyanates a) to the sum of the reactive hydrogen atoms of components b), c), d) and e) is from 1:0.8 to 1:1.25, preferably from 1:0.9 to 1:1.15. In the context of the invention, the mixture of the components a) to g) is referred to as reaction mixture at reaction conversions of less than 90%, based on the isocyanate groups.

The foamed polyurethanes according to the invention are preferably obtained by the one-shot process with the aid of the low-pressure or high-pressure technique. For the preparation of integral foams according to the invention, the starting components a) to g) are preferably mixed at a temperature of from 15 to 90° C., particularly preferably from 25 to 55° C., and the reaction mixture introduced, if appropriate, under elevated pressure, into the closed mold. The mixing can be carried out mechanically by means of a stirrer or a stirring screw or under high pressure in the so-called countercurrent injection process. The mold temperature is expediently from 20 to 160° C., preferably from 30 to 120° C., particularly preferably from 30 to 60° C.

The amount of the reaction mixture introduced into the mold is such that the integral foam moldings obtained have a density, according to DIN EN ISO 845, of from 150 to 1100 g/l, preferably from 200 to 1000 g/l and in particular from 500 to 950 g/l. The degrees of densification for the preparation of the moldings having densified edge zone and cellular core are in the range from 1.1 to 8.5, preferably from 2.1 to 7.0.

Foamed polyurethanes according to the invention are distinguished by pleasant haptic properties and very good dry and wet nonslip properties and by outstanding flexing endurance properties. Foamed polyurethanes according to the invention are therefore suitable as shoe soles, for example for walking shoes, sports shoes, sandals and boots, but also in the area of interior automotive trim, such as steering wheels, headrests or gear shift knobs, or motorcycle seats and as a spring element.

Below, the invention is illustrated by examples:

Starting Materials

Polyol 1: propylene glycol-initiated polyetherpolyol having an OH number of 29 and predominantly primary OH groups (composition 80% of propylene oxide, 20% of ethylene oxide)

Polyol 2: glycerol-initiated polyetherpolyol having an OH number of 27 and predominantly primary OH groups (composition 80% of propylene oxide, 20% of ethylene oxide)

Polyol 3: glycerol-initiated polyetherpolyol having an OH number of 35 and predominantly primary OH groups (composition 85% of propylene oxide, 15% of ethylene oxide)

Polyol 4: polymer polyetherol (styrene/acrylonitrile particles) based on polyol 3 having an OH number of 20 and a solids content of 45% by weight Polyol 5: dipropylene glycol-initiated polyetherpolyol having an OH number of 63 and predominantly primary OH groups (composition 70% of propylene oxide, 30% of ethylene oxide)

Polyol 6: polymer polyetherol (styrene/acrylonitrile particles) based on polyol 5 having an OH number of 36 and a solids content of 37% by weight Polyol 7: polymer polyetherol (styrene/acrylonitrile particles) based on polyol 5 having an OH number of 36 and a solids content of 37% by weight, the polyol macromer being esterified Polyol 8: unsaturated polyetherpolyol obtained from sorbitol, propylene oxide, ethylene oxide and meta-isopropenyl-benzyl isocyanate, having an OH number of 20

Polyol 9: unsaturated polyetherpolyol obtained from sorbitol, propylene oxide, ethylene oxide and meta-isopropenyl-benzyl isocyanate, having an OH number of less than 1, which was prepared from polyol 8 by esterification with acetic acid.

Catalyst 1: triethylenediamine
Catalyst 2: bis(2-dimethylaminoethyl)ether (Niax A1)
Catalyst 3: Formrez UL28

Catalyst 4: bis(dimethylaminopropyl)methylamine (Polycat 77)
Chain extender 1: monoethylene glycol
Chain extender 2: 1,4-butanediol
Crosslinking agent: ethoxylated glycerol
Crosslinking agent 2: glycerol
Antiabrasion agent: Luwax AF 31
Foam Stabilizer: DC 193® from Dow Corning, silicone-based
Blowing agent: water
Isocyanate 1: prepolymer (50 parts by weight of 4,4'-diisocyanatodiphenyl-methane (pure MDI), 2 parts by weight of uretonimine-modified pure MDI, 46 parts by weight of a linear propylene glycol-initiated polyoxypropylene-etherol (OH number 55 mg KOH/mg), 2 parts by weight of tripropylene glycol
Isocyanate 2: prepolymer (40 parts by weight of 4,4'-diisocyanatodiphenyl-methane (pure MDI), 6 parts by weight of uretonimine-modified pure MDI, 54 parts by weight of a linear propylene glycol-initiated polyoxypropylene-etherol (OH number 29 mg KOH/mg)

General Synthesis Method for Polymer Polyetherols:

The preparation of polymer polyetherols having a monomodal or bimodal particle size distribution was effected in a 4 liter glass flask with single-speed stirrer, attached reflux condenser and electrical heating jacket. Before the beginning of the reaction, the reactor is filled with a mixture of carrier polyol, in the case of bimodal polymer polyetherols additionally seed and a part of the macromer, flushed with nitrogen and heated to the synthesis temperature of 125° C. The remaining amount of macromer is metered during the synthesis. The remaining part of the reaction mixture comprising further carrier polyol, initiator, and the monomers was initially taken in two metering containers. The synthesis of the polymer polyols was effected by transferring the raw materials at constant metering rate via a static inline mixer into the reactor. The duration of metering for the monomer/moderator mixture was 150 minutes, while the polyol/initiator mixture was metered into the reactor over 165 minutes. After a subsequent reaction time of 10 minutes at 125° C., the product is freed from the unconverted monomers and other volatile compounds at a temperature of 135° C. under reduced pressure (<0.1 mbar). The end product is stabilized with antioxidants. The synthesis of sample amounts which are greater than 5 kg was effected in the pressure-resistant reactor having a two-speed stirrer and cooling coils. For removal of monomers, the product can be transferred to another container.

EXAMPLES

The polymer polyetherols polyol 4, polyol 6 and polyol 7 were prepared according to the following list and stated composition:

Polyol 4 Polymer Polyetherol in Polyol 3
Seed: polymer polyetherol in polyol 3 (8% by weight, based on the total amount)
Solid: poly(acrylonitrile-co-styrene)
Solids content: 45% by weight, based on the total mass of the dispersion
OH number: 20 mg KOH/g
Viscosity: 4800 mPa·s at 25° C.
Carrier polyol: polyol 3
Free radical initiator: azo initiator (1% by weight, based on the amount of monomer)
Moderator: n-dodecanethiol (1% by weight, based on the amount of monomer)
Macromer: polyol 8 (7% by weight, based on the amount of monomer)

Polyol 6 Polymer Polyetherol in Polyol 5
Solid: poly(acrylonitrile-co-styrene)
Solids content: 37% by weight, based on the total mass of the dispersion
OH number: 36 mg KOH/g
Viscosity: 1900 mPa·s at 25° C.
Carrier polyol: polyol 5
Free radical initiator: azo initiator (1% by weight, based on the amount of monomer)
Moderator: n-dodecanethiol (1% by weight, based on the amount of monomer)
Macromer: polyol 8 (6% by weight, based on the amount of monomer)

Polyol 7 Polymer Polyetherol in Polyol 5
Solid: poly(acrylonitrile-co-styrene)
Solids content: 37% by weight, based on the total mass of the dispersion
OH number: 36 mg KOH/g
Viscosity: 1900 mPa·s at 25° C.
Carrier polyol: polyol 5
Free radical initiator: azo initiator (1% by weight, based on the amount of monomer)
Moderator: n-dodecanethiol (1% by weight, based on the amount of monomer)
Macromer: polyol 9 (6% by weight, based on the amount of monomer)

The polyol components A1 to A5 were prepared according to the composition stated in table 1:

TABLE 1

|  | A1 (parts by weight) | A2 (parts by weight) | A3 (parts by weight) | A4 (parts by weight) | A5 (parts by weight) |
| --- | --- | --- | --- | --- | --- |
| Polyol 1 | 30.00 |  | 71.65 |  |  |
| Polyol 2 | 46.41 |  |  |  |  |
| Polyol 3 |  |  | 14.70 |  |  |
| Polyol 4 | 10.00 |  |  |  |  |
| Polyol 6 |  | 47.66 |  | 47.40 | 94.75 |
| Polyol 7 |  | 47.66 |  | 47.40 |  |
| Catalyst 1 | 0.92 | 0.40 | 0.96 | 0.74 |  |
| Catalyst 2 |  | 0.16 |  | 0.16 | 0.16 |
| Catalyst 3 | 0.04 | 0.10 | 0.05 | 0.10 | 0.10 |
| Catalyst 4 | 0.33 |  | 0.40 |  |  |
| Chain extender 1 | 2.5 | 2.45 |  | 2.51 | 2.80 |
| Chain extender 2 | 8.0 |  | 9.74 |  |  |
| Crosslinking agent 1 |  |  |  |  | 0.50 |
| Crosslinking agent 2 |  |  | 0.50 |  |  |
| Antiabrasion agent | 1.00 | 0.93 | 1.00 | 1.00 | 1.00 |
| Foam stabilizer | 0.30 | 0.34 | 0.60 | 0.36 | 0.36 |
| Blowing agent | 0.47 | 0.23 | 0.40 | 0.25 | 0.32 |

Experiments:

Reaction Mixture 1:

100 parts by weight of the polyol component A1 (45° C.) and 93 parts by weight of isocyanate 1 (40° C.) were mixed by means of a low-pressure shoe machine (EMB) and this mixture was introduced into an aluminum mold (200×200×10 mm) thermostated at 35° C., the mold was closed and the integral polyurethane foam thus prepared was demolded after 4 minutes.

Reaction Mixture 2:

100 parts by weight of the polyol component A2 (45° C.) and 48 parts by weight of isocyanate 1 (40° C.) were mixed by means of a low-pressure shoe machine (EMB) and this mixture was introduced into an aluminum mold (200×200×10 mm) thermostated at 30° C., the mold was closed and the integral polyurethane foam thus prepared was demolded after 4 minutes.

Reaction mixture 3:

100 parts by weight of the polyol component A3 (45° C.) and 107 parts by weight of isocyanate 2 (40° C.) were mixed by means of a low-pressure shoe machine (Gusbi) and this mixture was introduced into an aluminum mold (200×200×10 mm) thermostated at 35° C., the mold was closed and the integral polyurethane foam thus prepared was demolded after 4 minutes.

Reaction mixture 4:

100 parts by weight of the polyol component A4 (45° C.) and 48 parts by weight of isocyanate 1 (40° C.) were mixed by means of a low-pressure shoe machine (Gusbi) and this mixture was introduced into an aluminum mold (200×200×10 mm) thermostated at 35° C., the mold was closed and the integral polyurethane foam thus prepared was demolded after 4 minutes.

Reaction mixture 5:

100 parts by weight of the polyol component A5 (45° C.) and 52 parts by weight of isocyanate 1 (40° C.) were mixed by means of a low-pressure shoe machine (Gusbi) and this mixture was introduced into an aluminum mold (200×200×10 mm) thermostated at 35° C., the mold was closed and the integral polyurethane foam thus prepared was demolded after 4 minutes.

The mechanical properties of the samples produced were determined after storage for 24 hours according to DIN 53504, 53512 and ISO 34-1 and are listed in table 2.

TABLE 2

|  | Reaction mixture 1 | Reaction mixture 2 | Reaction mixture 3 | Reaction mixture 4 | Reaction mixture 5 |
| --- | --- | --- | --- | --- | --- |
| Molding density (g/L) | 760 | 760 | 650 | 640 | 660 |
| Hardness (Shore A) | 49 | 48 | 50 | 41 | 51 |
| Tensile strength (N/mm$^2$) | 5.5 | 6.3 | 4.6 | 3.6 | 5.7 |
| Elongation at break (%) | 473 | 416 | 571 | 314 | 393 |
| Tear propagation strength (N/mm) | 6.2 | 6.1 | 5.7 | 5.9 | 7.7 |
| Resilience (%) | 51 | 46 | — | 46 | 42 |
| Haptic properties | poor, plastic-like | pleasantly velvety | poor, plastic-like | pleasantly velvety | pleasantly velvety |
| Flexing endurance properties (mm) after 100 000 cycles at RT | 2.0 | 0.25 | 1.8 | <1.0 | <1.0 |
| Flexing endurance properties (mm) after 100 000 cycles at −15° C. | — | — | 2.6 | <1.0 | 1.2 |
| Coefficient of friction | 0.19 | 0.41 | — | — | — |

Table 2 clearly shows that the sheets of reaction mixture 2 have improved flexing endurance properties at room temperature and the sheets of reaction mixtures 4 and 5 have improved flexing endurance properties at room temperature and also at −15° C. compared with the corresponding references (1 and 3). The haptic properties of the sheets of these reaction mixtures are also rated as being substantially more pleasant and more velvety than the corresponding references 1 and 3. It is also clear that the coefficients of friction (measure of the wet nonslip property) of the sheets of reaction mixture 2 are higher than those of the corresponding reference 1.

We claim:

1. An integral foam comprising a foamed polyurethane comprising a foamed polyurethane obtained by mixing
   a) polyisocyanates;
   b) relatively high molecular weight compounds comprising groups reactive toward isocyanate groups;
   c) 15 to 80% by weight, based on the total weight of (a)-(f) of solid particles having an average particle diameter of from 0.01 to 50 µm and being produced by free radical polymerization;
   d) blowing agents;
   e) chain extender, crosslinking agent, or mixtures thereof;
   f) if appropriate, catalyst; and
   g) if appropriate, other additives to give a reaction mixture and allowing the reaction mixture to react to completion, wherein
      the proportion of chain extender, crosslinking agent, or mixtures thereof is less than 4% by weight, based on the total weight of components a) to f), and
      the relatively high molecular weight compounds have an average functionality less than 2.5, and
   wherein the total gross density averaged over the core and the edge zone of said foamed polyurethane, according to DIN EN ISO 845, is from 200 to 1000 g/L.

2. The integral foam according to claim 1, wherein the solid particles comprise at least one group reactive toward isocyanate.

3. The integral foam according to claim 2, wherein the solid particles are dispersed in the relatively high molecular weight compounds.

4. The integral foam according to claim 1, wherein the relatively high molecular weight compounds comprise a proportion of diol greater than 80% by weight, based on the total weight of the relatively high molecular weight compounds.

5. The integral foam according to claim 1, wherein the relatively high molecular weight compounds comprise a proportion of diol 100% by weight, based on the total weight of the relatively high molecular weight compounds.

6. The integral foam according to claim 1, wherein the proportion of chain extender is less than 3% by weight, based on the total weight of components a) to f).

7. The integral foam according to claim 1, wherein the total gross density averaged over the core and the edge zone of said foamed polyurethane, according to DIN EN ISO 845, is from 500 to 950 g/L.

8. A shoe sole comprising the integral foam according to claim 1.

9. A process for the preparation of an integral foam, comprising
mixing
a) polyisocyanates;
b) relatively high molecular weight compounds comprising groups reactive toward isocyanate groups;
c) 15 to 80% by weight, based on the total weight of (a)-(f) of solid particles having an average particle diameter of from 0.01 to 50 μm;
d) blowing agents;
e) chain extender, crosslinking agent or mixtures thereof;
f) if appropriate, catalyst; and
g) if appropriate, other additives to give a reaction mixture; and
allowing the reaction mixture to react to completion, wherein
the proportion of chain extender, crosslinking agent or mixtures thereof is less than 4% by weight, based on the total weight of components a) to f),
the relatively high molecular weight compounds have an average functionality less than 2.5, and
said mixing is at a temperature of from 15 to 90° C. and the resulting reaction mixture is introduced into a closed mold, and
wherein the total gross density averaged over the core and the edge zone of said foamed polyurethane, according to DIN EN ISO 845, is from 200 to 1000 g/L.

10. The integral foam according to claim 1, wherein the relatively high molecular weight compounds have a molecular weight greater than 400 g/mol.

11. The integral foam according to claim 1, wherein the relatively high molecular weight compounds have a molecular weight greater than 550 g/mol.

12. The process according to claim 9, wherein the relatively high molecular weight compounds have a molecular weight greater than 400 g/mol.

13. The process according to claim 9, wherein the relatively high molecular weight compounds have a molecular weight greater than 550 g/mol.

14. The integral foam according to claim 1, wherein (b) and (c) are comprised in a polymer polyol.

15. The process according to claim 9, wherein (b) and (c) are comprised in a polymer polyol.

16. The process of claim 9, wherein said mixing is at a temperature of 25 to 55° C.

17. The process of claim 9, wherein the reaction mixture is introduced under elevated pressure into said closed mold.

18. The process of claim 9, wherein the total gross density averaged over the core and the edge zone of said foamed polyurethane according to DIN EN ISO 845, is from 500 to 950 g/L.

19. The integral foam according to claim 1, wherein b) is a polyetherol having a number average molecular weight of from 750 to 4000 g/mol, a polyesterol having a number average molecular weight of from 1000 to 5000 g/mol, or mixture of said polyetherol and said polyesterol.

20. The process of claim 9, wherein b) is a polyetherol having a number average molecular weight of from 750 to 4000 g/mol, a polyesterol having a number average molecular weight of from 1000 to 5000 g/mol, or mixture of said polyetherol and said polyesterol.

21. The integral foam according to claim 1, wherein said integral foam is a resilient integral foam.

22. The integral foam according to claim 21, wherein the resilience is at least 42% to 51%.

23. The integral foam according to claim 1, wherein the degree of densification ranges from 1.1 to 8.5.

24. The integral foam according to claim 1, wherein the degree of densification ranges from 2.1 to 7.0.

* * * * *